United States Patent [19]

Kiritani et al.

[11] Patent Number: 4,465,755
[45] Date of Patent: Aug. 14, 1984

[54] PRESSURE FIXABLE ELECTROSTATOGRAPHIC TONER MATERIAL COMPRISING ENCAPSULATED PARTICLES CONTAINING CURING AGENT

[75] Inventors: Masataka Kiritani; Takeshi Mikami, both of Fujinomiya, Japan

[73] Assignee: Fuji Photo Film Co., Ltd.

[21] Appl. No.: 435,341

[22] Filed: Oct. 19, 1982

[30] Foreign Application Priority Data

Oct. 21, 1981 [JP] Japan ............................... 56-168137
Dec. 1, 1981 [JP] Japan ............................... 56-193464

[51] Int. Cl.$^3$ .............................................. G03G 9/08
[52] U.S. Cl. ................................... 430/111; 430/138; 430/109; 428/407; 428/402.21
[58] Field of Search ....................... 430/138, 109, 111; 428/407; 252/188.3, 316

[56] References Cited

U.S. PATENT DOCUMENTS 3,427,258 2/1969 Trease .............................. 430/107 X
3,506,469 4/1970 Titow .................................. 430/109
4,307,169 12/1981 Matkan ........................... 430/138 X

*Primary Examiner*—John D. Welsh
*Attorney, Agent, or Firm*—Toren, McGeady and Stanger

[57] ABSTRACT

An electrostatographic toner material suitably employable for the pressure fixing process, which comprises encapsulated toner particles having an average particle size in the range from about 0.5 to 1,000 microns, in which the toner particle comprises a pressure fixable adhesive core material containing a colorant and a curable substance and a pressure rupturable shell enclosing the core material, the outer surface of the shell being provided with a curing agent capable of curing said curable substance.

The curable substance and the curing agent can be separately incorporated into the core materials of the different encapsulated toner particles.

12 Claims, No Drawings

PRESSURE FIXABLE ELECTROSTATOGRAPHIC TONER MATERIAL COMPRISING ENCAPSULATED PARTICLES CONTAINING CURING AGENT

This invention relates to an electrostatographic toner material, and more particularly relates to a pressure fixable electrostatographic toner material comprising encapsulated toner particles.

There is known the electrostatography which comprises developing a tone electrostatic latent image contained on a photoconductive or dielectric surface with a toner material containing colorant and a fixing aid to produce a visible toner image, and transferring and fixing the visible toner image onto a surface of a support medium such as a sheet of paper.

The development of the latent image to produce a visible toner image is carried out by the use of either a developing agent consisting of a combination of toner material with carrier particles, or a developing agent consisting of toner material only. The developing process utilizing the combination of toner material with carrier particles is named "two component developing process", while the developing process utilizing only the toner material is named "one component developing process".

The toner image formed on the latent image is then transferred onto a surface of a support medium and fixed thereto. The process for fixing the toner image to the support medium can be done through one of three fixing processes, that is, a heat fixing process (fusion process), a solvent fixing process and a pressure fixing process.

The pressure fixing process which involves fixing the toner material onto the surface of a support medium under application of pressure thereto is described, for instance, in U.S. Pat. No. 3,269,626. The pressure fixing process involving the use of neither the heating procedure nor the solvent produces no such troubles as inherently attached to either the heat fixing process or the solvent fixing process. Moreover, the pressure fixing process can be employed with a high speed automatic copying and duplicating process, and the access time is very short in the pressure fixing process. Accordingly, the pressure fixing process is said to be an advantageous fixing process inherently having a variety of preferable features.

However, the pressure fixing process also has a variety of inadvantageous features. For instance, the pressure fixing process generally provides poorer fixability than the heat fixing process does, whereby the toner image fixed onto a paper is apt to rub off easily. Further, the pressure fixing process requires very high pressure for the fixing, and such a high pressure tends to break the cellulose fibers of the support medium such as paper and also produces glossy surface on the support medium. Moreover, the pressing roller requires to have relatively greater size, because the roller necessarily imparts very high pressure to the toner image on the support medium. Accordingly, reduction of the size of a copying and duplicating machine cannot exceed a certain limit defined by the size of the pressing roller.

There has been previously proposed an encapsulated toner material which comprises toner particles enclosed with micro-capsules, so as to overcome the above-described disadvantageous features of the pressure fixing process. The encapsulated toner material is prepared by enclosing core particles (containing colorant such as carbon black) with shells which are rupturable by the application of pressure. The so-prepared encapsulated toner material has various advantageous features; for instance, the fixing of the encapsulated toner material does not require very high pressure, and the fixability is excellent. Accordingly, the encapsulated toner material is viewed as suitable for the use in the pressure fixing process. However, the encapsulated toner materials proposed up to now appear unsatisfactory in practical use, because they are not able to satisfy certain characteristics required for providing smooth copying and duplicating operation and for accomplishing excellent toner image fixability and quality.

More in detail, it is required for the toner material for the use as a dry type developing agent in the electrostatography to have excellent powder characteristics (or, powder flow properties) to provide high development quality, and to be free from staining the surface of the photosensitive material on which the latent image is formed. The term "powder characteristics" particularly means resistance to agglomeration and blocking of the toner particles. In the process for the preparation of an encapsulated toner material, the toner material is generally separated from a toner dispersed solution and dried through a spray-drying procedure. The previously known encapsulated toner material is apt to undergo agglomeration either in the spray-drying process, or in the storage period after the spray-drying. The so agglomerated toner material markedly degrades the resolution of the visible toner image produced on the electrostatographic latent image, whereby markedly decreasing the sharpness of the visible toner image fixed onto the support medium.

Further, a toner material employed for the two component developing process is also required not to stain the surfaces of the carrier particles. The toner material for the use as a developing agent in the pressure fixing process is furthermore required to be satisfactory in the fixability under pressure and not to undergo off-setting against the roller surface, that is, phenomenon in which the toner adheres to the roller surface so as to stain it.

The encapsulated toner materials proposed until now are not satisfactory, at least, in one of these requirements for the developing agent to be employed for the pressure fixing process.

It is an object of the invention to provide an electrostatographic encapsulated toner material having improved pressure fixability.

It is another object of the invention to provide an encapsulated toner material improved in the pressure fixability, free from deterioration of the powder characteristics.

It is a further object of the invention to provide an encapsulated toner material improved in the pressure fixability which is resistant to rupture prior to the pressing operation in the pressure fixing process, while is easily rupturable in the pressure fixing operation.

The above-described objects and other objects which will be apparent from the hereinafter-given description are accomplished by the present invention, that is, an electrostatographic toner material comprising encapsulated toner particles having an average particle size in the range from about 0.5 to about 1,000 microns, in which the toner particle compriss a pressure fixable adhesive core material containing a colorant and a curable substance and a pressure rupturable shell enclosing the core material, the outer surface of the shell being provided with a curing agent capable of curing said curable substance.

These objects are also accomplished by an electrostatographic toner material comprising encapsulated toner particles having an average particle size in the range from about 0.5 to about 1,000 microns, in which the encapsulated toner particles comprise both of:

a toner particle comprising a pressure fixable adhesive core material containing a colorant and a curable substance and a pressure rupturable shell enclosing the core material; and a toner particle comprising a pressure fixable adhesive core material containing a colorant and a curing agent capable of curing said curable substance and a pressure rupturable shell enclosing the core material, which is another embodiment of the invention.

In the invention, examples of the curable substances and the curing agents therefor are as follows:

(1) curable substances: a polyisocyanate, a polyisocyanate adduct containing at least two isocyanate groups, a polyisothiocyanate, and a polyisocyanate adduct containing at least two isothiocyanate groups;

curing agents for the above curable substance: a polyhydric compound, an epoxy compound, a polycarboxylic acid, a polythiol, and a phenol-formalin resin:

(2) curable substance: an epoxy compound;

curing agents therefor: a polyamine or its derivative, an acid anhydride, imidazole, an amide, and a polysulfide:

(3) curable substance: an unsaturated polyester;

curing agents therefor: methyl ethyl ketone peroxide (plus cobalt naphthenate), a vinyl monomer;

(4) curable substance: a polysulfide;

curing agents therefor: tellurium dioxide, manganese dioxide, lead dioxide, and antimony trioxide;

(5) curable substances: a monoacrylate, a monomethacrylate, a polyacrylate or polymethacrylate of a polyhydric compound, a polyacrylate or polymethacrylate of a polyester, an epoxy-polyacrylate, an epoxy-polymethacrylate, and a polyurethane polyacrylate or polymethacrylate;

curing agent therefor: benzoyl peroxide.

Further details of the above-mentioned curable substances and curing agents are described below.

Examples of the polyisocyanates and polyisothiocyanates include diiso(thio)cyanates such as m-phenylenediisocyanate, p-phenylenediisocyanate, 2,6-tolylenediisocyanate, 2,4-tolylenediisocyanate, naphthalene-1,4-diisocyanate, diphenylmethane-4,4'-diisocyanate, 3,3'-dimethoxy-4,4'-biphenyldiisocyanate, 3,3'-dimethyldiphenylmethane-4,4'-diisocyanate, xylylene-1,4-diisocyanate, xylylene-1,3-diisocyanate, 4,4'-diphenylpropanediisocyanate, trimethylenediisocyanate, hexamethylenediisocyanate, propylene-1,2-diisocyanate, butylene-1,2-diisocyanate, ethylidynediisocyanate, cyclohexylene-1,2-diisocyanate, cyclohexylene-1,4-diisocyanate, p-phenylenediisocyanate, triphenylmethanediisocyanate, tetramethylenediisothiocyanate, hexamethylenediisothiocyanate, p-phenylenediisothiocyanate, xylylene-1,4-diisothiocyanate, and ethylidynediisothiocyanate; triiso(thio)cyanates such as 4,4',4''-triphenylmethanetriisocyanate, polymethylenepolyphenyltriisocyanate, and toluene-2,4,6-triisocyanate; and tetraiso(thio)cyanate such as 4,4'-dimethyldiphenylmethane-2,2',5,5'-tetraisocyanate.

Examples of the polyisocyanate adducts containing at least two isocyanate groups and the polyisothiocyanate adducts containing at least two isothiocyanate groups include adducts of a polyisocyanate or a polyisothiocyanate with a polyamine, a piperazine, a polycarboxylic acid, a polythiol, a polyhydric compound or an epoxy compound.

Examples of the polyamines include ethylenediamine, tetramethylenediamine, pentamethylenediamine, hexamethylenediamine, p-phenylenediamine, m-phenylenediamine, 2-hydroxytrimethylenediamine, diethylenetriamine, triethylenetetraamine, diethylaminopropylamine, tetraethylenepentaamine, and an addition product of an epoxy compound and an amine compound.

Examples of the piperazines include piperazine, 2-methylpiperazine, and 2,5-dimethylpiperazine.

Examples of the polycarboxylic acids include malonic acid, succinic acid, glutaric acid, adipic acid, pimelic acid, maleic acid, isophthalic acid, terephthalic acid, and gluconic acid.

Examples of the polythiols include condensation products of thioglycol, and reaction products of thioglycol with polyols.

Examples of the polyhydric compounds include polyols such as aliphatic or aromatic polyols, hydroxypolyesters and hydroxypolyalkylene ethers.

Examples of the polyols include ethylene glycol, 1,4-butanediol, catechol, resorcinol, hydroquinone, 1,2-dihydroxy-4-methylbenzene, 1,3-dihydroxy-5-methylbenzene, 3,4-dihydroxy-1-methylbenzene, 3,5-dihydroxy-1-methylbenzene, 2,4-dihydroxy-1-ethylbenzene, 1,3-naphthalenediol, 1,5-naphthalenediol, 2,3-naphthalenediol, 2,7-naphthalenediol, o,o'-biphenol, p,p'-biphenol, 1,1-bi-2-naphthol, Bisphenol A, 2,2'-bis(4-hydroxyphenyl)butane, 2,2'-bis(4-hydroxyphenyl)-isopentane, 1,1'-bis(4-hydroxyphenyl)-cyclopentane, 1,1'-bis(4-hydroxyphenyl)-cyclohexane, 2,2'-bis(4-hydroxy-3-methylphenyl)-propane, bis(2-hydroxyphenyl)-methane, xylylenediol, ethyleneglycol, 1,3-propylene glycol, 1,4-butylene glycol, 1,5-pentanediol, 1,6-heptanediol, 1,7-heptanediol, 1,8-octanediol, trimethylolpropane, hexanetriol, pentaerythritol, glycerol, and sorbitol.

Examples of the hydroxypolyesters include esters of polycarboxylic acids with polyols. Examples of the polycarboxylic acids and polyols are as described above.

Examples of the hydroxypolyalkylene ethers include condensation products between alkylene oxides and polyols. Examples of the alkylene oxides include butylene oxide and amylene oxide. Examples of the polyols are as described above.

The polyhydric compound and polythiol of the curing agents for the above-described polyisocyanates, etc. can be the same as those mentioned above.

Examples of the epoxy compounds employable as the curing agents include aliphatic glycidyl ethers such as diglycidyl ether, glycerol triglycidyl ether and a polyallylglycidyl ether having the molecular weight of 150–5,000; aliphatic glycidyl esters such as diglycidylester of linolein dimer acid; aromatic glycidyl ethers such as diglycidylether of Bisphenol A, triglycidylether of trihydroxyphenylpropane, and tetraglycidylether of tetraphenylene-ethane; and glycidyl ether-ester mixtures such as diglycidyletherester of 4,4-bis(4-hydroxyphenyl)pentanoic acid.

Examples of the polycarboxylic acids employable as the curing agents include pimelic acid, suberic acid, azelaic acid, sebacic acid, phthalic acid, terephthalic acid, 4,4'-biphenyl-dicarboxylic acid and 4,4'-sulfonyldibenzoic acid.

Examples of the epoxy compounds employable as the curable substances are those mentioned above in connection with the curing agents.

Examples of the polyamines and their derivatives for curing the epoxy compounds are those mentioned above in connection with the adducts of polyisocyanates and polyisothiocyanates, as well as other compounds having a great number of amine groups in the molecular such as gelatin. In other words, there is no limitation on the polyamine, so far as it has at least two amine groups in the molecular.

Other compounds mentioned before as employable as the curable substances and the curing agents can be chosen from known compounds.

There is no specific limitation on the material of shell of the encapsulated toner according to the invention, as far as the material is pertinent to the production of the shell. Examples of the shell materials include gum arabic, gelatin, polyester, polyamide, polystyrene, polycarbonate, polyether, polyethylene, polyurea, polyurethane, polythiourethane, polythiourea, and copolymers such as poly(styrene-methacrylate) and poly(styrene-acrylate). Preferred are polyurethane, polyurea and polythiourethane.

The shell can be composed substantially of a complex layer. For instance, the shell can comprise two or more polymers selected from the group consisting of polyurethane, polyurea and polyamide.

In the present invention, the term "polyurethane, polyurea and polythiourethane" means a polymer produced by the polycondensation reaction between polyisocyanate and/or polythioisocyanate and one or more of the counterpart compounds such as polyol, polythiol, water, polyamine and piperazine. Accordingly, the term "polyurethane" means either a simple polyurethane comprising substantially the urethane bondings only or a polymer comprising the urethane bondings and a relatively small number of the urea and/or thiourethane bondings. The term "polyurea" means either a simple polyurea comprising substantially the urea bondings only or a polymer comprising the urea bondings and a relatively small number of the urethane and/or thiourethane bondings. In the same way, the term "polythiourethane" means either a simple polythiourethane comprising substantially the thiourethane bondings only or a polymer comprising the thiourethane bondings and a relatively small number of the urethane and/or urea bondings.

The material preferably employed for preparing the shell in the invention is a polycondensation product of polyisocyanate, polyol and water, or a polycondensation product of polyisocyanate, polyol and polyamine.

The electrostatographic toner material of the invention is preferably prepared by a process which comprises encapsulating very small droplets of the pressure fixable adhesive core material containing a colorant and a curable substance or a curing agent dispersed in an aqueous medium with the pressure rupturable shell material to prepare encapsulated particles; separating the encapsulated particles from the aqueous medium to obtain dry encapsulated toner materials; and providing the surface thereof with a curing agent, if necessary.

The encapsulation of the droplets of the core material with the shell material can be done by any known method for preparing the so-called micro-capsule containing a hydrophobic liquid, such as the phase separation method as described in U.S. Pat. No. 2,800,457 and No. 2,800,458; the interfacial polymerization as described in Japanese Patent Publications No. 38(1963)—19,574, No. 42(1967)—446 and No. 42(1967)—771, British Pat. No. 989,264, No. 950,443, No. 867,797, No. 1,069,140 and No. 1,046,409; the method involving polymerization of a monomer in oil droplets as described in Japanese Patent Publication No. 36(1961)—9,168; the method involving melting, dispersing and cooling procedures as described in British Pat. No. 952,807 and No. 965,074; and the spray drying method as described in U.S. Pat. No. 3,111,407 and British Pat. No. 930,422.

Among these encapsulating method, the interfacial polymerization method comprising the following process is preferably employed for the preparation of the toner material of the invention.

In the first place, the following two substances are selected:

Substance (A) which as such is a hydrophobic liquid or a substance soluble, miscible or well dispersable in a hydrophobic liquid; and Substance (B) which as such is a hydrophilic liquid or a substance soluble, miscible or well dispersable in a hydrophilic liquid, in which Substance (A) can react with Substance (B) to produce polyurethane, polyurea or polythiourethane insoluble in either the hydrophobic liquid or the hydrophilic liquid.

In the second place, very small droplets of a hydrophobic liquid including Substance (A) and the core material containing a colorant and having an average diameter in the range from about 0.5 to about 1,000 microns are dispersed in a hydrophilic liquid such as water containing Substance (B).

A catalyst can be incorporated in either or both of the hydrophobic liquid and the hydrophilic liquid.

The substance (A) is caused to react with Substance (B) to undergo interfacial polymerization in the dispersion by an appropriate procedure, for instance, by heating the dispersion. Thus, the shells of polyurethane, polyurea or polythiourethane are formed around the hydrophobic droplets including the core material and the colorant, and accordingly the encapsulation of the core material and the colorant with the shell is accomplished to produce encapsulated toner particles in the aqueous liquid.

Examples of Substance (A) preferably employable for the preparation of the shell in the invention include polyisocyanates, polycyanate adducts containing at least two isocyanate groups, polyisothiocyanates, and polyisothiocyanate adducts containing at least two isothiocyanate groups. Examples of these compounds are those mentioned before in connection with the curable substances and curing agents.

Examples of Substance (B) preferably employable for the preparation of the shell in the invention include water, polyols, polythiols, polyamines, and piperazines. Examples of these compounds are those mentioned before in connection with the curable substances and curing agents.

In the preparation of the dispersion of the very small hydrophobic droplets containing Substance (A) and the core material, the hydrophobic liquid to be dispersed preferably contains a low-boiling solvent or a polar solvent. These solvents serve for accelerating formation of the shell which is a reaction product between the Substance (A) and the Substance (B). Examples of these solvents include methyl alcohol, ethyl alcohol, diethyl ether, tetrahydrofuran, dioxane, methyl acetate, ethyl acetate, acetone, methyl ethyl ketone, methyl isobutyl ketone, cyclohexanone, n-pentane, n-hexane, benzene, petroleum ether, chloroform, carbon tetrachloride, methylene chloride, ethylene chloride, carbon disulfide and dimethylformamide.

The encapsulated toner material whose shell is composed substantially of a complex layer comprising two or more polymers selected from the group consisting of polyurethane, polyurea and polyamide can be produced as follows:

In a hydrophobic liquid comprising core materials such as colorant, pressure fixable adhesive material (binder), and a curable substance or a curing agent, are dissolved an acid chloride and a polyisocyanate. This solution is then dispersed in an aqueous medium comprising a polyamine or piperazine and a dispersing agent to produce fine droplets of the core material having an average diameter in the range from about 0.5 to about 1,000 microns in the aqueous medium.

The dispersion produced above in then neutralized or made weak-alkaline by addition of an alkaline substance, and subsequently heated to a temperature between 40° and 90° C. Upon completion of these procedure, a complex layer consisting substrantially of a polyamide and a polyurethane, in which the polyamide is a reaction product produced by reaction between the acid chloride and the polyamine, and the polyurea is a reaction product produced by reaction between the polyisocyanate and the polyamine, is formed around the droplet of core material containing a binder, a colorant and a curable substance or a curing agent. Thus, the encapsulated particle having the complex layer shell is obtained.

If a polyol is further added to the hydrophobic liquid in the above, there is produced around the hydrophobic core material droplet a complex layer shell consisting substantially of the polyamide and a polyurethane, in which the polyurethane is a reaction product of the polyisocyanate with the polyol.

In the latter procedure, a complex layer consisting substantially of the polyamide, polyurea and polyurethane can be produced, if the polyamine is introduced into the reaction system in an amount exceeding the amount required to react the introduced acid chloride.

The shell of the so produced particle is, as described above, a complex layer shell. The term "complex layer shell" means a shell comprising a polymer mixture, as well as a double layer shell. The term "double layer shell" is not intended to mean only a shell in which the two layers are completely separated by a simple interface, but include a shell in which the interface is not clearly present in the shell, but the ratio between one polymer and another polymer (or other polymers) varies from the inner phase to the outer phase of the shell.

Examples of acid chlorides include adipoyl chloride, sebacoyl chloride, phthaloyl chloride, isophthaloyl chloride, terephthaloyl chloride, fumaroyl chloride, 1,4-cyclohexanedicarbonyl chloride, 4,4'-biphenyldicarbonyl chloride, 4,4'-sulfonyldibenzoyl chloride, phosgene, polyesters containing acid chloride groups, and polyamides containing acid chloride groups.

The acid chloride can be replaced with a dicarboxylic acid or its acid anhydride. Examples of the dicarboxylic acids include adipic acid, sebacic acid, phthalic acid, terephthalic acid, fumaric acid, 1,4-cyclohexanedicarboxylic acid and 4,4'-biphenyldicarboxylic acid. Examples of the acid anhydrides include phthalic anhydride.

As for the other aspects of the interfacial polymerization method and the other processes for the preparation of micro-capsules containing an oily liquid, there are given descriptions in U.S. Pat. No. 2,726,804, which is introduced hereinto as the referance.

The core material of the invention contains a colorant for producing a visible image from the latent image. The colorant generally is a dye or a pigment, but a certain agent providing no directly visible image such as a fluorescent substance can be employed as the colorant, if desired.

The colorant is generally selected from a variety of the dye, pigment and the like employed generally in the conventional electrostatographic copying and duplicating process. Generally the colorant is a black toner or a chromatic toner. Examples of the black toners include carbon black. Examples of the chromatic toners include blue colorants such as copper phthalocyanine and a sulfonamide derivative dye; yellow colorants such as a benzidine derivative colorant, that is generally called Diazo Yellow; and red colorants such as Rhodamine B Lake that is a double salt of xanthin dye with phosphorus wolframate and molybdate, Carmine 6B belonging to Azo pigment, and a quinacridone derivative.

The core material of the invention further contains a binder for keeping the colorant within the core and assisting the fixing of the colorant onto the surface of a support medium such as paper. The binder is generally selected from high-boiling liquids conventionally employed or proposed for employment for finely dispersing an oil-soluble photographic additive within an aqueous medium to incorporate the additive into a silver halide color photosensitive material, and selected from polymers proposed for employment as the binders for the pressure fixable encapsulated toner materials.

Examples of the high-boiling liquids include the following compounds having the boiling point of higher than 180° C.:

(1) Phthalic esters dibutyl phthalate, dihexyl phthalate, diheptyl phthalate, dioctyl phthalate, dinonyl phthalate, dodecyl phthalate, butyl phthalyl butyl glycolate, dibutyl monofluorophthalate;

(2) Phosphoric acid esters tricresyl phosphate, trixylenyl phosphate, tris(isopropylphenyl) phosphate, tributyl phosphate, trihexyl phosphate, trioctyl phosphate, trinonyl phosphate, tridecyl phosphate, trioleyl phosphate, tris(butoxyethyl) phosphate, tris(chloroethyl) phosphate, tris(dichloropropyl) phosphate;

(3) Citric acid esters

O-acetyl triethyl citrate, O-acetyl tributyl citrate, O-acetyl trihexyl citrate, O-acetyl trioctyl citrate, O-acetyl trinonyl citrate, O-acetyl tridecyl citrate, triethyl citrate, tributyl citrate, trihexyl citrate, trioctyl citrate, trinonyl citrate, tridecyl citrate;

(4) Benzoic acid esters butyl benzoate, hexyl benzoate, heptyl benzoate, octyl benzoate, nonyl benzoate, decyl benzoate, dodecyl benzoate, tridecyl benzoate, tetradecyl benzoate, hexadecyl benzoate, octadecyl benzoate, oleyl benzoate, pentyl o-methylbenzoate, decyl p-methylbenzoate, octyl o-chlorobenzoate, lauryl p-chlorobenzoate, propyl 2,4-dichlorobenzoate, octyl 2,4-dichlorobenzoate, stearyl 2,4-dichlorobenzoate, oleyl 2,4-dichlorobenzoate, octyl p-methoxybenzoate;

(5) Aliphatic acid esters hexadecyl myristate, dibutoxyethyl succinate, dioctyl adipate dioctyl azelate, decamethylene-1,10-diol diacetate, triacetin, tributin, benzyl caprate, pentaerythritol tetracaproate, isosorbitol dicaprilate;

(6) Alkylnaphthalenes methylnaphthalene, dimethylnaphthalene, trimethylnaphthalene, tetramethylnaphthalene, ethylnaphthalene, diethylnaphthalene, triethylnaphthalene, monoisopropylnaphthalene, diisopropylnaphthalene, tetraisopropylnaphthalene, monomethylethylnaphthalene, isooctylnaphthalene;

(7) Dialkylphenyl ethers di-o-methylphenyl ether, di-m-methyldiphenyl ether, di-p-methylphenyl ether;

(8) Amides of fatty acids and aromatic sulfonic acid

N,N-dimethyllauroamide, N,N-diethylcaprylamide, N-butylbenzenesulfonamide;

(9) Trimellitic acid esters trioctyl trimellitate;

(10) Diarylalkanes diarylmethanes, e.g., dimethylphenylphenylmethane, diarylethanes, e.g., 1-methylphenyl-1-phenylethane, 1-dimethylphenyl-1-phenylethane, 1-ethylphenyl-1-phenylethane.

The above-listed high-boiling liquids and examples of other high-boiling liquids employable in the invention are described in detail in the following publications:

Japanese Patent Publications No. 46(1971)—23,233 and No. 49(1974)—29,461; Japanese Patent Provisional Publications No. 47(1972)—1,031, No. 50(1975)—62,632, No. 50(1975)—82,078, No. 51(1976)—26,035, No. 51(1976)—26,036, No. 51(1976)—26,037, No. 51(1976)—27,921, and No. 51(1976)—27,922; U.S. Pat. No. 2,322,027, No. 2,353,262, No. 2,533,514, No. 2,835,579, No. 2,852,383, No. 3,287,134, No. 3,554,755, No. 3,676,137, No. 3,676,142, No. 3,700,454, No. 3,748,141, No. 3,837,863, and No. 3,936,303; British Pat. No. 958,441, No. 1,222,753, No. 1,346,364, and No. 1,389,674; and West Germany Offenlegungsschrift No. 2,538,889.

For the purpose of the invention, the high-boiling liquid is preferably selected from the phthalic acid esters, phosphoric acid esters and alkylnaphthalenes.

Examples of the polymers include the following polymers:

polyolefins, olefin copolymers, polystyrene, styrenebutadiene copolymer, epoxy resins, polyesters, natural and synthetic rubbers, polyvinylpirolidone, polyamides, cumarone-indene copolymer, methyl vinyl ether-maleic anhydride copolymer, maleic acid-modified phenol resin, phenol-modified terpene resin, silicone resins, epoxymodified phenol resin, amino resins, polyurethane elastomers, polyurea elastomers, homopolymers and copolymers of acrylic acid ester, homopolymers and copolymers of methacrylic acid ester, acrylic acid-long chain alkyl methacrylate copolymer oligomer, poly(vinyl acetate), and poly(vinyl chloride).

The above-listed polymers and examples of other polymers employable in the invention are described in detail in the following publications:

Japanese Patent Publications No. 48(1973)—30,499, No. 49(1974)—1,588 and No. 54(1979)—8,104; Japanese Patent Provisional Publications No. 48(1973)—75,032, No. 48(1973)—78,931, No. 49(1974)—17,739, No. 51(1976)—132,838, No. 52(1977)—98,531, No. 52(1977)—108,134, No. 52(1977)—119,937, No. 53(1978)—1,028, No. 53(1978)—36,243, No. 53(1978)—118,049, No. 55(1980)—89,854 and No. 55(1980)—166,655; and U.S. Pat. No. 3,788,994 and No. 3,893,933.

The core material can further contain other agents such as a releasing agent and magnetizable particles.

The releasing agent serves for keeping the ruptured shell and the released core material from adhering to the surface of the pressing roller. The releasing agent can be chosen from those proposed for employment in the previously reported encapsulated toners. Examples of the releasing agents include a fluorine-containing resin described in Japanese Patent Provisional Publications No. 55(1980)—142,360 and No. 55(1980)—142,362.

The magnetizable particles are included in the core material where a magnetizable toner material for the one component developing process is desired. As for the magnetizable particles, there are descriptions, for instance, in Japanese Patent Provisional Publications No. 53(1978)—118,053, No. 53(1978)—1,028 and No. 55(1980)—166,655. Examples of materials of the magnetizable particles preferably employed in the invention include metals such as cobalt, iron and nickel; metal alloys or metal compositions comprising aluminum, cobalt, copper, iron, lead, magnesium, nickel, tin, zinc, gold, silver, antimony, beryllium, bismuth, cadmium, calcium manganese, titanium, tungsten, vanadium and/or zirconium; metallic compounds including metal oxides such as aluminium oxide, ferric oxide, cupric oxide, nickel oxide, zinc oxide, zirconium oxide, titanium oxide and magnesium oxide; refractory metal nitrides such as chromium nitride; metal carbides such as tungsten carbide and silicon carbide; ferromagnetic ferrite; and their mixtures.

The curable substance and the curing agent can be introduced into the core by adding it to the hydrophobic liquid comprising other core materials such as a binder and a colorant and then carrying out the encapsulation as described before.

Details of the encapsulation of the curable substance and the curing agent are shown in U.S. Pat. No. 3,467,544 and No. 4,102,800; Adhesive Age, 20(3) 37 (1977); Preparation, Property and Application of Microcapsule (in Japanese) pp. 333-349, written by Section of Pharmaceutical Physico-Chemistry, Pharmaceutical Department, Tokyo Science College (published by I.P.C. Co., Ltd., Japan); Journal of Japan Adhesion Society, 14(7), 246-277 (1978); British Pat. No. 1,108,727 and No. 1,103,202; Japanese Patent Publications No. 42(1967)—16760, No. 43(1968)—25676, and No. 54(1979)—31468.

The provision of the curing agent onto the surface of the shell can be carried out, for instance, by mixing the curing agent with the encapsulated toner powder. Otherwise, the curing agent in a solution, an emulsion or a dispersion can be introduced into a liquid containing the encapsulated toner particles, and the liquid medium is then removed. Preferably, a solution, an emulsion or a dispersion containing the curing agent is added to the reaction medium containing the encapsulated toner particles, and then the mixture is spray-dried.

The curable substance of the invention is generally employed in the amount of 2–60% by weight of the encapsulated particle. The amount of 5–30% by weight is preferred. The curing agent is generally employed in the amount of 1–200% by weight of the curable substance employed. Preferred is the amount of 5–130% by weight, and particularly preferred in the amount of 20–110% by weight.

If the curing agent is provided onto the surface of the shell of the encapsulated toner material, the curing agent preferably is one being solid at room temperature so as not to disturb the flow properties of the toner material. Out of the solid curing agents, the metal oxide is preferred because the provision of the metal oxide onto the shell surface not only improves the flow properties of the toner material, but also imparts enough electroconductivity to the shell surface. Accordingly, the encapsulated toner material having the metal oxide curing agent on the surface is advantageous for the use in the one component developing process. Particularly preferred metal oxide is a metal oxide doped with a different metal, because the electroconductivity given by the doped metal oxide is remarkably high.

As mentioned hereinbefore, a process for the preparation of the encapsulated toner particles includes a stage for dispersing or emulsifying very small droplets of the hydrophobic liquid containing Substance (A) and the core material in the aqueous medium. For the preparation of the homogeneous dispersion (or, emulsion) of the very small droplets of the hydrophobic liquid, it is preferred to incorporate into the reaction liquid a hydrophobic protective colloid and/or an emulsifying surface active agent which assist the production of the homogeneous dispersion (or, emulsion) of the hydrophobic droplets and prevention of agglomeration of the so-produced hydrophobic droplets. The hydrophilic protective colloid and the surface active agent can be employed alone or in combination.

Examples of the preferred hydrophilic protective colloids include proteins such as gelatin, graft polymers of gelatin and other polymers, albumin, and casein; cellulose derivatives such as hydroxyethylcellulose, carboxymethylcellulose, and cellulose sulfuric acid ester; saccharide derivatives such as sodium alginate and starch derivatives; and a variety of synthetic hydrophilic homopolymers and copolymers such as polyvinyl alcohol, partially acetalized polyvinyl alcohol, poly-N-vinyl pyrolidone, polyacrylic acid, polyacrylic amide, polyvinylimidazole and polyvinylpyrazole.

In the above-listed examples, the gelatin can be a lime-treated gelatin, an acid-treated gelatin, a hydrolyzed gelatin, and an enzymically decomposed gelatin. The graft polymers of gelatin and other polymers can be gelatins carrying graft chains consisting of homopolymers or copolymers of vinyl monomers such as acrylic acid, methacrylic acid, their derivatives, e.g., esters and amides, acrylonitrile, and styrene. Examples of the gelatin graft polymers are those miscible with gelatin such as the gelatins carrying the graft chains consisting of polymers of acrylic acid, methacrylic acid, acrylamide, methacrylamide and hydroxyalkyl methacrylate.

Details of these preferred gelatin graft polymers are described in U.S. Pat. No. 2,763,625, No. 2,831,767, and No. 2,956,884.

Representative examples of the synthetic hydrophilic polymers are described, for instance, in West German Offenlegungsschrift No. 2,312,708, U.S. Pat. No. 3,620,751 and No. 3,879,205, and Japanese Patent Publication No. 43(1968)—7,561.

The surface active agents for dispersing or emulsifying the hydrophobic liquid in the hydrophilic liquid medium can be incorporated into either or both of the hydrophobic liquid and the hydrophilic liquid medium.

Examples of the surface active agents include nonionic surface active agents, for instance, saponin (steroide type), alkylene oxide derivatives such as polyethylene glycol, polyethylene glycol/polypropylene glycol condensation product, alkyl- or alkylarylether of polyethylene glycol, polyethylene glycol esters, polyethylene glycol sorbitol ester, alkylamine or amide of polyalkylene glycol, polyethylene oxide adduct of silicone polymer, glycidol derivatives such as polyglyceride alkenylsuccinate and alkylphenol polyglyceride, fatty acid esters of polyhydric alcohols, alkylesters of saccharide, urethanes and ethers; and anionic surface active agents having acidic groups such as carboxy, sulfo, phospho, sulfate ester and phosphate ester groups, for instance, triterpenoide-type saponin, alkylcarboxylic acid salts, alkylsulfonic acid salts, alkylbenzenesulfonic acid salt, alkylnaphthalenesulfonic salts, alkylsulfate esters, alkylphosphate esters, N-acyl-N-alkyl-taurines, sulfosuccinic acid esters, sulfoalkyl-polyoxyethylene alkyl phenyl ethers, and polyoxyethylene alkylphosphate esters.

Particularly preferred surface active agents are anionic surface active agents belonging to the sulfonic acid type and the sulfate ester type, namely, compounds having in the molecular structure both of hydrophobic groups containing 8–30 carbon atoms and hydrophilic groups of $-SO_3M$ or $-OSO_3M$ (in which M is Na or K). These preferred anionic surface active agents belonging to the above-mentioned types are described in detail in "Surface Active Agents" (A. W. Perry; Interscience Publication Inc., New York).

Representative examples of the preferred anionic surface active agents are as follows: sodium dodecylsulfate, sodium tetradecylsulfate, Turkey red oil, sodium dodecylcarboxyamidoethylsulfate, sodium dodecylsulfonate, sodium tetradecylsulfonate, sodium polyoxyethylene-octylphenyl-ethersulfonate, sodium salt of sulfosuccinic acid dioctylester, sodium dodecylbenzenesulfonate, sodium tetradecylamidophenylsulfonate, and sodium tri-isopropylnaphthalenesulfonate.

Dispersing or emulsifying the reaction liquid can be carried out by means of a known homogenizer such as one belonging to the stirring type, the high pressure injecting type, the ultrasonic vibrating type and the kneader type. Particularly preferred homogenizers are a colloid mill, a conventional homogenizer, and electromagnetic distortion inducing ultrasonic homogenizer.

The encapsulated toner is then produced, for instance, by heating the emulsified reaction liquid in the presence of an appropriate catalyst, as described hereinbefore, so as to form shells around the core material droplets. Subsequently, the encapsulated toner is separated from the aqueous reaction medium and dried to obtain a dry encapsulated toner. The encapsulated toner is preferably washed with water after the separation from the aqueous reaction medium and prior to the drying procedure. The drying procedure can be carried out by a known process such as the spray-drying process or the freeze-drying process. The spray-drying process is preferred.

The so-produced dry encapsulated toner can be admixed with an insulating material and/or a charge controller such as a metal-containing dye or Nigrosine dye.

The dry encapsulated toner can be admixed with a flow lubricant such as hydrophobic silica powder so that the flow lubricant can be dispersed over the surface of the encapsulated toner. The encapsulated toner having the flow lubricant such as hydrophobic silica powder over the toner surface shows particularly improved powder quality and property, and accordingly is very advantageous in the practical use.

The encapsulated toner obtained as above can be introduced into the electrostatographic copying and duplicating machine to develop an electrostatographically produced latent image so as to produce a visible toner image on the surface of the photoconductive material. The visible image is then fixed onto a support medium such as paper by means of an appropriate pressure fixing apparatus. There is no limitation on the pressure fixing apparatus for fixing the encapsulated toner of the invention, and any known apparatus can be applied to the fixing of the encapsulated toner of the invention. Examples of the pressure fixing apparatuses include those illustrated in Japanese Patent Publications No. 44(1969)—9,880, No. 44(1969)—12,797, and No. 46(1971)—15,876; and Japanese Patent Provisional Publications No. 49(1974)—62,143, No. 49(1974)—77,641, No. 50(1975)—51,333, No. 51(1976)—31,235, No. 51(1976)—40,351, No. 52(1977)—15,335, No. 52(1977)—102,743, No. 54(1979)—28,636, No. 54(1979)—32,326, No. 54(1979)—41,444, and No. 54(1979)—48,251.

The electrostatographic toner material comprising the encapsulated toner particles of the invention has improved powder characteristics, and is resistant to the mechanical shock and abrasion in the developing apparatus of the electrostatographic copying and duplicating machine. Further, the electrostatographic toner material of the invention is easily rupturable in the pressure fixing apparatus to produce a visible toner image well fixed onto the support medium such as paper. Furthermore, the toner material of the invention hardly undergoes off-setting to a pressing roller and hardly undergoes the so-called filming on the surfaces of the carrier particles, the developing sleeves and the photoconductive material.

In the employment for the two component developing process, the toner material of the invention can be appropriately charged to carry an electric charge in the range of 10–20 $\mu c/g$ (plus or minus) in combination with an adequate carrier or with an adequate charge controller, so as to provide a visible image fixed on a support medium with high quality such as high resolution and high sharpness with substantially no fog. The development characteristics and the pressure fixability of the toner material of the invention are kept at an excellent level even after copying and duplicating procedure is repeated to a certain extent.

Even in the employment for the one component developing process, the toner material of the invention is well qualified in the developing characteristics, the pressure fixing characterisics and the resistance to the off-setting. Moreover, no filming is produced on the surfaces of the development sleeve and the photosensitive material.

Other features of the electrostatographic copying and duplicating process employing an encapsulated toner material are described in U.S. Pat. No. 3,788,994, which is introduced hereinto as the reference.

The present invention will be illustrated by the following examples which are by no means intended to introduce any restriction into the invention.

EXAMPLE 1

Into a dispersion of 3 g. of carbon black and 15 g. of magnetite in 27 g. of dibutyl phthalate was introduced 10 g. of a mixture of acetone and methylene chloride (1:3, volume ratio), and the mixture was then admixed to become homogeneous. In the resulting dispersion was dissolved 5 g. of a polysulfide (curable substance) having the formula:

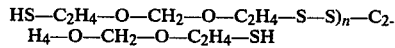

(n is 1–25, LP-3: trade name of Thiokol Corporation). This dispersion was named primary liquid.

Subsequently, 4 g. of an adduct of hexamethylenediisocyanate with hexanetriol was added to the primary liquid to prepare secondary liquid.

Independently, 3 g. of gum arabic was dissolved in 57 g. of water at 20° C., and into this solution under vigorous stirring was poured little by little the secondary liquid. Thus, there was obtained an oil-in-water emulsion containing oily droplets having average diameter of 5–15$\mu$. The procedure for the preparation of the emulsion was carried out under cooling the reaction vessel for keeping the temperature of the emulsion below 20° C.

To the emulsion was further added under stirring 100 g. of water heated to 40° C. After completion of the addition of water, the emulsion was gradually heated to 90° C. over 30 min. The emulsion was kept under stirring at the temperature for 20 min. so as to complete the encapsulating reaction.

The dispersion containing the encapsulated oily particles was subjected to centrifugal separation at 5,000 r.p.m. to separate the encapsulated particles from the aqueous gum arabic solution. The so separated encapsulated particles were again dispersed in 100 cc. of water, and the dispersion was dried in a spray-drying apparatus to obtain a powdery encapsulated toner material.

The encapsulated toner material obtained above was composed of a core containing the carbon black, magnetite, dibutyl phthalate and the polysulfide and a shell made substantially of a reaction product of the adduct of hexamethylenediisocyanate with hexanetriol and water. Microscopic observation of the encapsulated toner indicated that most of the toner particles were present independently and that no bulky agglomerated particles were formed.

To the encapsulated toner obtained in the above was added 2 g. of tellurium dioxide and 1 g. of antimony trioxide (both, curing agent). The mixture was then blended well to give an electroconductive toner material containing magnetic substance.

The electroconductive toner material was employed in the one component developing process to develop the latent image produced in a conventional electrostatographic process through magnetic brush development so as to produce a visible image. The visible toner image was then converted onto a paper.

The paper carrying the toner image was treated under a pressing roller at a pressure of 350 kg./cm².

There was obtained a toner image with high sharpness and well fixed onto the paper. Further, the off-setting of the toner was at a very low level.

Scrubbing the fixed toner image at lapse of 6 hours with a finger did not result in staining of the finger and paper with removed toner material.

EXAMPLE 2

In a dispersion of 1 g. of carbon black in 13 cc. of tricresyl phosphate was dissolved 2 g. of an adduct of tolylenediisocyanate with hexanetriol (3:1 molar ratio adduct) to prepare a primary liquid.

Independently, 7 g. of polyvinyl alcohol was dissolved in 100 cc. of water to prepare a secondary liquid.

The primary liquid was dropped into the secondary liquid under stirring to disperse very small droplets of the primary oily liquid in the secondary liquid. The mixture was further emulsified under stirring at room temperature for approximately 2 hours followed by stirring at 80° C. for approximately 1 hour. While the stirring was carried out, the diisocyanate adduct reacted with water to produce insoluble shells enclosing the oily droplets to yield encapsulated toner particles.

To the so prepared dispersion containing the encapsulated particles was added 100 cc. of a mixture of isopropyl alcohol and water (1:9) containing 0.2% by weight of a fluorine-containing surface active agent of the formula:

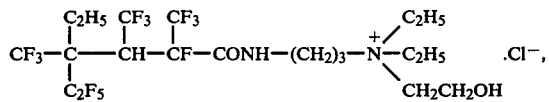

0.6% by weight of p-phenylenediamine and Bisphenol A of 0.6% by weight (both, curing agent).

The dispersion was then dried in a spray-drying apparatus to obtain a powdery encapsulated toner material.

The encapsulated toner material obtained above was composed of a core containing the carbon black, tricresyl phosphate an unreacted adduct of tolylenediisocyanate with hexanetriol and a shell made substantially of a reaction product of the adduct of tolylenediisocyanate with hexanetriol and water. Microscopic observation of the encapsulated toner indicated that most of the toner particles were present independently and that no bulky agglomerated particles were formed.

The evaluation of the encapsulated toner was carried out as follows.

Five parts by weight of the toner were admixed with 95 parts by weight of powdery iron carrier in a shaking apparatus to prepare a developing agent. It was confirmed through microscopic observation that the developing agent contained no ruptured toner particles.

A conventional electrostatographic copying and duplicating process with a selenium photosensitive material was carried out using the above developing agent. The visible toner image produced on a latent image was then converted onto a paper. The paper carrying the toner image was treated under a pressing roller at a pressure of 350 kg/cm². There was obtained a toner image with high sharpness and well fixed onto the paper. Further, the off-setting of the toner was at a very low level.

Scrubbing the fixed toner image at lapse of 6 hours with a finger did not result in staining of the finger and paper with removed toner material.

EXAMPLE 3

Into a dispersion of 3 g. of carbon black and 15 g. of magnetite in 27 g. of diisopropylnaphthalene was introduced a mixture of acetone and methylene chloride (1:3, volume ratio) containing 3.6 g. of polyurethane-polyacrylate (curable substance) and 0.3 g. of N,N-dimethyl-p-toluidine (catalyst), and the resulting mixture was well admixed to become homogeneous. This dispersion was named primary liquid.

Subsequently, 4 g. of an adduct of hexamethylenediisocyanate with hexanetriol was added to the primary liquid to prepare secondary liquid.

Independently, 3 g. of gum arabic was dissolved in 57 g. of water at 20° C., and into this solution under vigorous stirring was poured little by little the secondary liquid. Thus, there was obtained an oil-in-water emulsion containing oily droplets having average diameter of 5–15μ. The procedure for the preparation of the emulsion was carried out under cooling the reaction vessel for keeping the temperature of the emulsion below 20° C.

To the emulsion was further added under stirring 100 g. of water heated to 40° C. After completion of the addition of water, the emulsion was gradually heated to 90° C. over 30 min. The emulsion was kept under stirring at the temperature for 20 min. so as to complete the encapsulating reaction.

The dispersion containing the encapsulated oily particles was subjected to centrifugal separation at 5,000 r.p.m. to separate the encapsulated particles from the aqueous gum arabic solution. The so separated encapsulated particles were again dispersed in 100 cc. of water, and the dispersion was dried in a spray-drying apparatus to obtain a powdery encapsulated toner material.—Encapsulated toner A.

The encapsulated toner A obtained above was composed of a core containing the carbon black, magnetite, dibutyl phthalate and the polyurethane-polyacrylate and a shell made substantially of a reaction product of the adduct of hexamethylenediisocyanate with hexanetriol and water. Microscopic observation of the encapsulated toner indicated that most of the toner particles were present independently and that no bulky agglomerated particles were formed.

The same procedure as described above was repeated except that 3.6 g. of the polyurethane-polyacrylate and 0.3 g. of the N,N-dimethyl-p-toluidine were replaced with 0.3 g. of benzoyl peroxide (curing agent) to prepare an encapsulated toner B containing the benzoyl peroxide in the core.

20 g. of the encapsulated toner A and 20 g. of the encapsulated toner B were mixed, and 1 g. of carbon black was added to the mixture. The mixture was then blended well to give an electroconductive toner material containing magnetic substance.

The electroconductive toner material was employed in the one component developing process to develop the latent image produced in a conventional electrostatographic process through magnetic brush development so as to produce a visible image. The visible toner image was then converted onto a paper.

The paper carrying the toner image was treated under a pressing roller at a pressure of 350 kg/cm².

There was obtained a toner image with high sharpness and well fixed onto the paper. Further, the off-setting of the toner was at a very low level.

Scrubbing the fixed toner image at lapse of 5 min. with a finger did not result in staining of the finger and paper with removed toner material.

EXAMPLE 4

In a dispersion of 1.5 g. of carbon black in 13 cc. of tricresyl phosphate containing 1.7 g. of epoxy-polymethacrylate (curable substance) and 0.1 g. of N,N-dimethylaniline (catalyst) was dissolved 2 g. of an adduct of tolylenediisocyanate with hexanetriol (3:1 molar ratio adduct) to prepare a primary liquid.

Independently, 7 g. of polyvinyl alcohol was dissolved in 100 cc. of water to prepare a secondary liquid.

The primary liquid was dropped into the secondary liquid under stirring to disperse very small droplets of the primary oily liquid in the secondary liquid. The mixture was further emulsified under stirring at room temperature for approximately 2 hours followed by stirring at 80° C. for approximately 1 hour. While the stirring was carried out, the diisocyanate adduct reacted with water to produce insoluble shells enclosing the oily droplets to yield encapsulated toner particles.

The so prepared dispersion containing the encapsulated particles was washed three times with water, and to this was added 20 g. of water containing 1% by weight of fluorine-containing surface active agent of the formula:

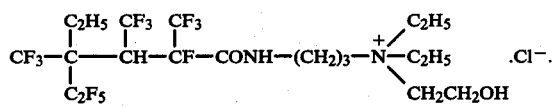

The dispersion was then dried in a spray-drying apparatus to obtain a powdery encapsulated toner A.

The encapsulated toner material obtained above was composed of a core containing the carbon black, tricresyl phosphate, and the epoxy-polymethacrylate and a shell made substantially of a reaction product of the adduct of tolylenediisocyanate with hexanetriol and water. Microscopic observation of the encapsulated toner A indicated that most of the toner particles were present independently and that no bulky agglomerated particles were formed.

The same procedure as described above was repeated except that 1.7 g. of the epoxy-methacrylate and 0.1 g. of N,N-dimethylaniline were replaced with 0.2 g. of benzoyl peroxide (curing agent) to prepare an encapsulated toner B containing the benzoyl peroxide in the core.

The encapsulated toners A and B (10 g. each) and iron carrier (380 g.) were mixed well, and the development was carried out in the same manner as in Example 2.

There was obtained a toner image with high sharpness and well fixed onto the paper. Further, the off-setting of the toner was at a very low level.

Scrubbing the fixed toner image at lapse of 6 min. with a finger did not result in staining of the finger and paper with removed toner material.

EXAMPLE 5

Into a dispersion of 3 g. of carbon black and 15 g. of magnetite in 27 g. of diisopropylnaphthalene was introduced a mixture of acetone and methylene chloride (1:3, volume ratio) containing 8 g. of Epikote 828 (curable substance, epoxy compound), and the mixture was well admixed to become homogeneous. To this was then added 4 g. of terephthalic dichloride to produce a secondary liquid.

Independently, 3 g. of gum arabic was dissolved in 57 g. of water at 20° C., and into this solution under vigorous stirring was poured little by little the secondary liquid. Thus, there was obtained an oil-in-water emulsion containing oily droplets having average diameter of 10–15µ. Subsequently, to the emulsion was added 2 g. of hexamethylenediamine in 100 g. of water. The mixture was heated to 60° C., and the reaction was carried out for 3 hours to produce a shell consisting substantially of the reaction product of terephthalic dichloride with hexamethylenediamine.

The dispersion containing the encapsulated oily particles was subjected to centrifugal separation at 5,000 r.p.m. to separate the encapsulated particles from the aqueous gum arabic solution. To the so separated particles were added 100 cc. of water, and the so produced dispersion was dried in a spray-drying apparatus to obtain a powdery encapsulated toner A.

Independently, 100 g. of Curing Agent T (available from Shell Petroleum, USA, aliphatic polyamine compound) containing 30 g. of magnetitie was dropped into 1,000 cc. of carbon tetrachloride containing 2 g. of terephthalic dichloride to produce an emulsion containing a large number of small droplets. The emulsion was then kept at the state at 20° C. for approximately 3 hours, causing reaction of terephthalic dichloride with Curing Agent T on the surface of the droplet to produce a solid polymer film insoluble in either of carbon tetrachloride and Curing Agent T. A part of Curing Agent T not yet reacted was then enclosed with the so produced film, and thus an encapsulated particles containing Curing Agent T was obtained. These particles were then collected by filtration and drying procedure to produce an encapsulated material B.

6 g. of the encapsulated toner A and 0.1 g. of the encapsulated material B was mixed, and 0.2 g. of carbon black was added to the mixture. The mixture was then blended well to give an electroconductive toner material containing magnetic substance.

The electroconductive toner material was employed in the one component developing process to develop a latent image produced in a conventional electrostatographic process through magnetic brush development so as to produce a visible image. The visible toner image was then converted onto a paper.

The paper carrying the toner image was treated under a pressing roller at a pressure of 350 kg./cm².

There was obtained a toner image with high sharpness and well fixed onto the paper. Further, the off-setting of the toner was at a very low level.

Scrubbing the fixed toner image at lapse of 6 hours with a finger did not result in staining of the finger and paper with removed toner material.

We claim:

1. An electrostatographic toner material comprising encapsulated toner particles having an average particle size in the range from about 0.5 to about 1,000 microns, in which the toner particle comprises a pressure fixable adhesive core material containing a colorant and a curable substance and a pressure rupturable shell enclosing the core material, the outer surface of the shell being provided with a curing agent capable of curing said curable substance.

2. An electrostatographic toner material comprising encapsulated toner particles having an average particle size in the range from about 0.5 to about 1,000 microns, in which the encapsulated toner particles comprise both of:
- a toner particle comprising a pressure fixable adhesive core material containing a colorant and a curable substance and a pressure rupturable shell enclosing the core material; and
- a toner particle comprising a pressure fixable adhesive core material containing a colorant and a curing agent capable of curing said curable substance and a pressure rupturable shell enclosing the core material.

3. The electrostatographic toner material as claimed in claim 1 or 2, in which the curable substance is a polyvalent isocyanate adduct.

4. The electrostatographic toner material as claimed in claim 1 or 2, in which the curable substance is an epoxy compound.

5. The electrostatographic toner material as claimed in claim 1 or 2, in which the curable substance is an unsaturated polyester.

6. The electrostatographic toner material as claimed in claim 1 or 2, in which the curable substance is a polysulfide.

7. The electrostatographic toner material as claimed in claim 1 or 2, in which the curable substance is a polyurethane-polyacrylate or a polyurethane-polymethacrylate.

8. The electrostatographic toner material as claimed in claim 1 or 2, in which the shell is made of a polymer selected from the group consisting of polyurethane, polyurea and polythiourethane.

9. The electrostatographic toner material as claimed in claim 8, in which the shell is made substantially of a polycondensation product of polyisocyanate, polyol and water.

10. The electrostatographic toner material as claimed in claim 8, in which the shell is made substantially of a polycondensation product of polyisocyanate, polyol and polyamine.

11. The electrostatographic toner material as claimed in claim 1 or 2, in which the shell is composed substantially of a complex layer comprising two or more polymers selected from the group consisting of polyurethane, polyurea and polyamide.

12. The electrostatographic toner material as claimed in claim 1 or 2, in which the pressure fixable adhesive core material is a liquid medium boiling at a temperature of higher than 180° C.

* * * * *